Patented June 12, 1923.

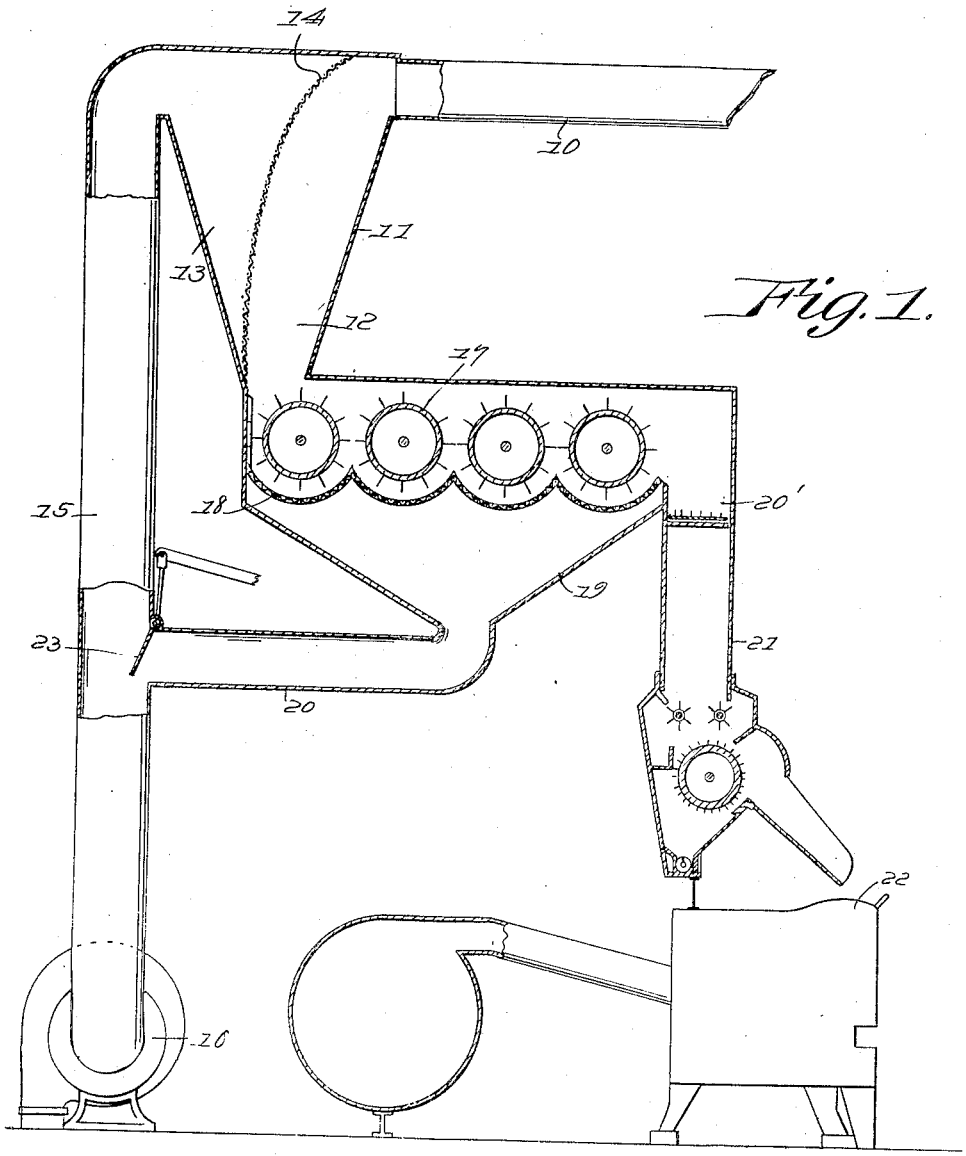

1,458,870

UNITED STATES PATENT OFFICE.

AUGUST ZOELLER, OF SACRED HEART, OKLAHOMA.

COTTON CLEANER.

Application filed July 6, 1922. Serial No. 573,192.

*To all whom it may concern:*

Be it known that AUGUST ZOELLER, a citizen of the United States of America, residing at Sacred Heart, in the county of Pottawatomie and State of Oklahoma, has invented new and useful Improvements in Cotton Cleaners, of which the following is a specification.

The object of the invention is to provide a cotton cleaning apparatus used as a means for feeding the raw cotton to the gins, and particularly cleaners of the Munger type, wherein the tension or degree of suction as applied by the exhaust fan to the screens in conjunction with which the spiked rollers operate may be varied or tempered with relation to the tension in the vacuum box wherein the substantially vertical screen is disposed, to minimize the load of the fan by counteracting the tendency of the cotton to becoming packed on the first-named screens and thereby practically cut off the passage of air therethrough; and with this object in view the invention consists in a construction and combination of parts of which a preferred embodiment is shown in the accompanying drawings, wherein:—

The figure is a sectional view of a cotton cleaning and distributing apparatus constructed in accordance with the invention.

The trunk or cotton feeding conveyor 10 is arranged in communication with the vacuum box 11 preferably near the upper end of the latter, and interiorly the vacuum box is separated into cotton conveying and vacuum chambers 12 and 13 by a substantially upright screen 14 which is curved or arched toward the discharge end of the trunk 10 toward its upper edge with the connection of the suction pipe 15 extending from the exhaust fan 16 also located at or near the top of the vacuum box opposite to the cotton trunk, said suction pipe and trunk having communication respectively with the vacuum chamber 13 and the cotton chamber 12.

As in the ordinary practice the spiked rollers 17 are arranged in a substantially horizontal series respectively in operative relation with curved breast portions 18 of a screen which is disposed in a second vacuum box 19 having a funnel shaped bottom with which communicates a branch conveyor 20 leading to and communicating with the suction pipe 15 and hence subject to the influence of the exhaust fan to the end that air is drawn downward through the screen members 18, or as they may be termed the roller screens for the purpose of removing the dust and like foreign matter from the cotton as it is agitated by the spiked rollers and is moved by the rotation of said rollers toward the distributor 20' for deposit in the beater mechanism 21 and conveyance thence to the gins 22.

At the intersection of the suction conveyor 15 and the branch conveyor 20 there is located a controlling valve 23 adapted for arrangement in partial or complete closing relation with either the conveyor or its branch so as to distribute or divide the force or tension of the suction between the main conveyor and the branch in such proportions or at such a ratio as to maintain the cotton on the auxiliary or roller screen in a sufficiently loose condition to facilitate its movement by the rollers and also facilitate the separation of dust therefrom without impeding the movement of the rollers or tending to cut off the passage of air downward through the auxiliary vacuum box 19. Obviously the proportionate reduction of the stress or tension of suction in the auxiliary vacuum box and the increase of same in the main vacuum box 11 as by moving the controlling valve to reduce the area of the opening of communication with the draft pipe will not only reduce the tendency to pack or mat the cotton on the auxiliary or roller screen by lessening the downward pressure thereon, but will tend to lift and loosen the cotton on said screen by the increased rarification of the air in the main vacuum box 11 since, by the arrangement indicated, the main and branch suction conveyors communicate with vacuum boxes which are disposed at opposite sides of the plane of the auxiliary screen and hence to a certain extent tend to oppose each other.

It has been found in practice that by a judicious adjustment of the controlling valve the force of the suction may be varied to suit the condition of the cotton which is being treated so as to materially facilitate the operation of the mechanism and insure a proper conditioning of the cotton prior to its delivery to the gins.

Having described the invention, what is claimed as new and useful is:—

1. A cotton cleaning apparatus having main and auxiliary vacuum boxes of which the latter receives cotton from the former and is provided with spiked rollers and a cooperating sectionally breasted auxiliary screen and is in communication with the distributor, a suction conveyor having main and branch members in communication respectively with said main and auxiliary suction boxes, and a controlling valve located at the intersection of said main and branch members for arrangement in relative cut-off relation respectively therewith.

2. A cotton cleaning apparatus having main and auxiliary vacuum boxes of which the latter receives cotton from the former and is provided with spiked rollers and a cooperating sectionally breasted auxiliary screen and is in communication with the distributor, a suction conveyor having main and branch members in communication respectively with said main and auxiliary suction boxes, and a controlling valve located at the intersection of said main and branch members for arrangement in relative cut-off relation respectively therewith, the main suction box being provided with a partitioning screen dividing the same interiorly into cotton conveying and vacuum chambers, said screen being disposed in a substantially upright position and the cotton conveying trunk and the main member of the suction conveyor being in communication respectively with said cotton conveying and vacuum chambers.

3. A cotton cleaning apparatus having main and auxiliary vacuum boxes of which the latter receives cotton from the former and is provided with spiked rollers and a cooperating sectionally breasted auxiliary screen and is in communication with the distributor, a suction conveyor having main and branch members in communication respectively with said main and auxiliary suction boxes, and a controlling valve located at the intersection of said main and branch members for arrangement in relative cut-off relation respectively therewith, the main suction box being provided with a partitioning screen dividing the same interiorly into cotton conveying and vacuum chambers, said screen being disposed in a substantially upright position and the cotton conveying trunk and the main member of the suction conveyor being in communication respectively with said cotton conveying and vacuum chambers at points near the upper ends thereof and in diametrically opposed relation.

In testimony whereof he affixes his signature.

AUGUST ZOELLER.